May 7, 1946. W. D. KELLY 2,399,639
STOP NUT OR THE LIKE
Filed July 24, 1943
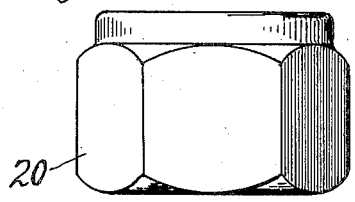
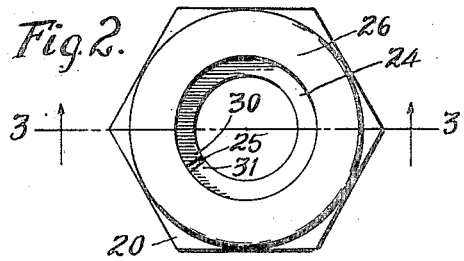
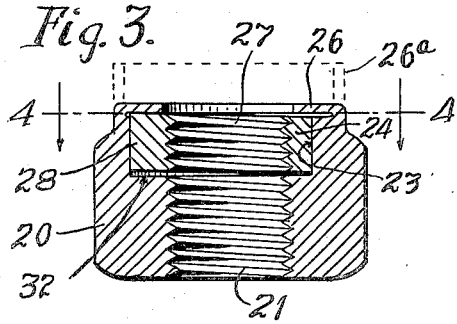
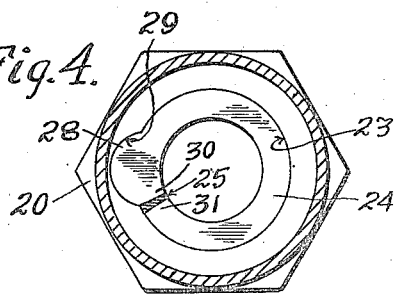
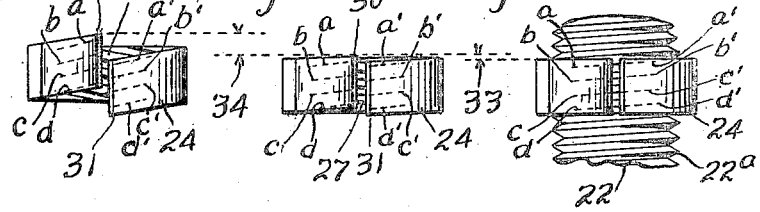
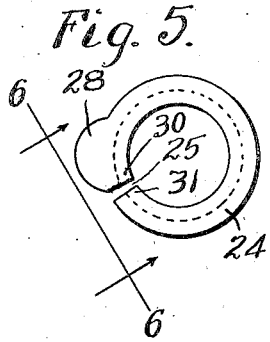
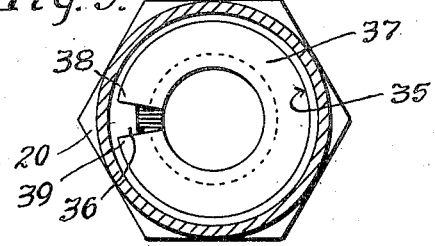
INVENTOR.
William D. Kelly
BY
Eugene M. Giles
Atty Patented May 7, 1946

2,399,639

UNITED STATES PATENT OFFICE 2,399,639

STOP NUT OR THE LIKE

William D. Kelly, Western Springs, Ill.

Application July 24, 1943, Serial No. 496,017

7 Claims. (Cl. 151—14)

My invention relates to nuts, or other internally threaded parts, which are adapted to have threaded engagement with another externally threaded part, such as a bolt, and has reference more particularly to facilities for insuring such frictional engagement of these threaded parts with one another that they remain securely engaged and immune to accidental displacement, even under the most severe conditions of actual use, and yet may be disengaged quite readily without any injury to either part and may be reused indefinitely with the same assurance of immunity to accidental relative displacement.

Various devices and expedients have been employed for locking or holding two mating threaded parts, such as a bolt and its nut, against relative movement or displacement when engaged, but most of these devices and expedients are inconvenient, objectionable or unsatisfactory for one reason or another and have only a limited field of usefulness.

Locking arrangements have been used, such for example as a pin inserted through an opening in the threaded stem and engaged with notches or openings of the nut to prevent relative movement thereof. Lock washers have also been used, one type of which has spur like portions which bite into the bearing face of the nut and also into the surface against which the nut is clamped and another type of which has portions which are bendable into interlocking engagement with the nut and the part to which the nut or bolt is applied. There are also various other types of locking expedients, along these and other lines, which have been proposed and used to some extent.

More recently, however, so called stop nuts have been used to an increasing extent, having frictional facilities of various kinds intended to cause a sufficient gripping action of the nut upon the bolt or threaded stem to assure retention of the nut on the stem in any position of adjustment thereof.

While a stop nut has certain very definite advantages over lock nuts or other locking facilities for holding the nut on the bolt or threaded stem, the making of a satisfactory stop nut is an especially difficult problem, not only because of the extraordinary displacement conditions to which devices of this character are frequently subjected and the great necessity of infallibility in many places in which they are used, but there are other conditions frequently encountered, such as exposure to oil, grease, high temperatures, wide ranges of temperature variations and more or less abuse which they must withstand without impairment of the certainty and security of their holding effect. Moreover it is highly desirable that in the use thereof no mutilation or impairment of the bolt threads, nut threads or even of the holding facilities themselves shall occur other than natural wear, and that the nut, although securely held in place, is quite readily removed and can be reused indefinitely with the same assurance as originally of immunity to accidental displacement.

Generally the stop nut must be made approximately the same size as the corresponding ordinary nut and capable of sustaining the same load, and there is, accordingly, only a very limited space in which frictional facilities may be accommodated for holding the nut against displacement or relative movement on the threaded stem. Because of this space limitation, the problem of making a stop nut with all the aforementioned necessary and desirable characteristics is peculiarly and extraordinarily difficult, and those now available are understood by applicant to be lacking in certain desirable characteristics.

Some, for example, have ample gripping effect initially but the gripping effect diminishes with repeated use and they can be removed and reused only a few times with assurance that they will hold. Others grip the threaded stem in a manner and with such rigidity that removal of the nut is difficult and likely to damage either the stem or the gripping facilities. Still others have insufficient bearing surface on the threads of the threaded stem and impose excessive localized strains thereon, whereas others are not immune to oils, grease and high temperatures, and still others have the gripping facility exposed so that they are readily damaged.

The principal objects of my invention are to provide an improved stop nut or the like of simple construction, adapted to quantity production at a reasonably low cost; to provide highly effective gripping facilities in sufficiently compact form to be accommodated readily within the limited space available in stop nuts of acceptable size; to construct the lock nut with a gripping member resiliently engaged with the threaded stem throughout a substantial area and at a sufficient prearranged tension to assure adequate frictional engagement to hold the nut securely in any position to which it may be adjusted; to provide gripping facilities the effectiveness of which is not impaired by repeated removal and reusing of the nut nor by oil, grease, high temperature or extreme variations in temperature; to incorporate the gripping facilities in the nut so they are enclosed and protected against damage; and in general to provide a stop nut which may be used generally and repeatedly for any purpose with certainty of secure holding under substantially any conditions that may be encountered in the use thereof, these and other objects being accomplished as pointed out hereinafter and as disclosed in the accompanying drawing in which Fig. 1 is a side view of a stop nut constructed in accordance with my invention;

Fig. 2 is a top view thereof;

Fig. 3 is a sectional view taken on the line 3—3 of Fig. 2;

Fig. 4 is a sectional view of the nut taken on the line 4—4 of Fig. 3;

Fig. 5 is a top view of the gripping member.

Fig. 6 is a side view of the gripping member in the relaxed condition in which it is prepared for incorporation in the nut, said view being taken from the line 6—6 of Fig. 5;

Fig. 7 is a view similar to Fig. 6 showing the gripping member as compressed and under tension in the nut;

Fig. 8 is a view similar to Fig. 6 showing the gripping member in the gripping position on a threaded stem; and Fig. 9 is a view similar to Fig. 4 showing a modified form of gripping member.

Referring to the drawing, the reference numeral 20 indicates the body of the nut which is of conventional hexagonal form with an opening internally threaded as at 21 to engage a threaded stem 22 such as the threaded end of a bolt. At the outer end of the threaded portion 21 the nut body 20 is provided with a circular cavity 23 to accommodate the gripping member 24 which is in the form of a split ring, divided at 25 and held in the circular cavity 23 by the turned over edge 26 of the nut body 20.

This split ring 24, although fitting closely within the cavity 23, has a sliding fit therein axially for purposes hereinafter explained, but is non-rotatable therein and provided with internal threads 27 forming substantially a continuation of the threading 21 of the nut body 20 so as to engage readily the threads of a threaded stem 22 upon which the nut is applied.

The split ring 24 may be held against rotation in the cavity 23 in any convenient manner that will permit the required gripping action of the split ring or gripping member 24, as for example by a radial offset 28 on the periphery of the split ring 24 engaged in a seat 29 in the annular wall of the cavity 23 so as to produce a key and keyway effect which prevents rotary movement of the gripping member 24 in the cavity 23 while at the same time permitting axial movement of the keyed portion of the split ring 24 in the seat or keyway 29. This radial offset or key 28 may be located at one end of the split ring as shown or intermediate of the ends or elsewhere if desired.

Obviously the keying offset or lug 28 and the seat or keyway 29 may be of the rounded or substantially semicircular shape shown or of any other shape which will satisfactorily serve the purpose and permit the required freedom of movement of the end of the split ring axially, the rounded form being advantageous as it permits convenient milling of the seat 29 in the nut body.

The split ring 24, which provides the gripping action to hold the nut against displacement on the threaded stem 22 is of suitable springy material, usually metal, to afford substantial tension upon deflection thereof, and may be of the same material as the nut body, although this is not essential except in cases in which galvanic action is to be avoided.

The split ring 24, which, as above pointed out, is internally threaded so that the threading 27 thereof affords a continuation of the threading 21 of the nut body, has the threads 27 thereof arranged so that they align at the split ends 30 and 31 only when the ring 24 has a truly circular form and the separated ends 30 and 31 are directly opposed as shown in Fig. 8. It is an important feature of this invention, however, that this split ring 24 is normally of spiral form with the separated ends 30 and 31 thereof offset axially, substantially as shown in Fig. 6, a much greater distance than they are offset in the assembled nut, so that in the normal relaxed form of the split ring the threads at one side of the split 25, which are indicated by the dotted lines $a$, $b$, $c$ and $d$, are materially out of alignment with their corresponding threads at the opposite side of the split 25, which are indicated by the dotted lines $a'$, $b'$, $c'$ and $d'$ respectively, and in order that these threads 27 may engage the threads 22$^a$ of the threaded stem 22 when the nut is applied thereon, the split ring 24 must be deflected from its normal spiral form of Fig. 6 to the flat circular form of Fig. 8 to obtain the proper alignment of the threads $a$, $b$, $c$ and $d$ at one side of the split with the corresponding respective threads $a'$, $b'$, $c'$ and $d'$ at the other side of the split to accommodate the threads 22$^a$ of the threaded stem 22.

This deflection of the split ring 24 from the normal spiral form thereof (see Fig. 6) to the flat circular form (see Fig. 8) creates a tension, the magnitude of which depends upon the material of which the split ring is composed, the extent of normal offset of the ends 30 and 31, and the consequent amount of deflection necessary to align the ends 30 and 31, and it also depends upon the width (crosswise of the threaded face) of the stock of which the split ring is composed and the thickness thereof, and this tension, thus created, produces a frictional engagement of the threads 27 of the split ring 24 with the threads of the threaded stem 22 for holding the stop nut in any position of adjustment on said stem.

It is a further important feature of this invention that the split ring 24 in the nut assembly is compressed almost but not quite to the flat circular form in which the threads $a$, $b$, $c$ and $d$ are aligned with the respective threads $a'$, $b'$, $c'$ and $d'$ and to this end the split ring is confined between the base or shoulder 32 of the cavity 23 and the overturned flange 26 so that the threads $a$, $b$, $c$ and $d$ are offset from their respective threads $a'$, $b'$, $c'$ and $d'$ only to a slight extent substantially as indicated at 33, it being merely necessary to have sufficient offset to impose the tension of the split ring on the threads 22$^a$ of the threaded stem 22 when the latter is engaged with the threads 27 of the split ring 24, and with some allowance for wear so that upon repeated use of the nut and wear of the threads that may occur upon repeated application and removal of the nut to and from the stem 22, the tension of the split ring 24 will be constantly effective to hold the nut in any position of adjustment on the threaded stem 22.

Thus the split ring as assembled in the nut has an accumulated or initial tension which becomes effective, upon a very slight relative movement of the ends 30 and 31 thereof, to impose a frictional engagement, equal to that tension, between the threads 27 of the split ring and the threads 22ª of the threaded member 22 as soon as the latter engages with the split ring 24.

Preferably the extent of offset of the ends 30 and 31 in the nut is relatively slight as indicated at 33 in Fig. 7 and of course varies according to the size of the nut and the threaded stem upon which it is used. For example, I have found that ten one-thousandths of an inch offset for the ends 30 and 31 in a nut for a one-fourth inch bolt with twenty-eight threads to the inch is ample to insure imposition of the full tension of the compressed split rings upon the engaged threads 27 and 22ª and to compensate for any wear that occurs between these threads, whereas a proportionately larger offset is required for larger sizes of bolts and nuts.

Moreover, it is preferable that the normal spiral shape of the gripping member 24 in the relaxed condition of Fig. 6 be such that the ends 30 and 31 are offset sufficiently to require considerable compression, such as indicated at 34 to flatten the gripping member to the installed flattened spiral form of Fig. 7, this being desirable to provide ample accumulated or initial tension in the flattened spiral form of Fig. 7 to insure adequate friction for certainty of holding of the nut on the stem 22 upon the further slight flattening of the gripping member to the flat circular form of Fig. 8 which the gripping member assumes when the nut is applied on the threaded stem 22.

It will be understood, of course, that in the compressed condition of the gripping member 24 in the cavity 23 of the nut, the opposed ends 30 and 31 of the split ring 24 bear respectively against the turned over flange 26 and the base or shoulder 32 of the nut cavity 23 and that the accumulated tension of the compressed split ring is imposed on said flange 26 and shoulder 32 at all times except when the threaded stem 22 is inserted through the threaded opening 21 of the nut into the threaded opening of the split ring 24, whereupon the engagement of the threads 22ª of the stem with the threads 27 of the split ring causes the split ends 30 and 31 to become aligned, relieves the flange 26 and shoulder 32 from the tension of the split ring 24 and causes that tension to be assumed by the threads 22ª of the stem 22 thereby creating a corresponding friction between the threads 22ª and 27.

Obviously, therefore, to provide the above indicated slight offset 33 of the ends 30 and 31 and the corresponding misalignment of the threads $a$, $b$, $c$ and $d$ with the threads $a'$, $b'$, $c'$ and $d'$ in the assembled nut, the end 30 when normally bearing against the flange 26 is spaced the distance 33 from the shoulder 32 and when the threads 22ª of the stem 22 are engaged with the split ring 24, the end 30 is deflected thereby the distance 33 toward the shoulder 32 and the key lug 28 is, of course, free to move correspondingly in the keyway 29.

The frictional engagement that occurs between the threads 27 and 22ª when the nut is applied on the stem 22 is directly caused by the accumulated or initial tension of the split ring 24 plus the slight increase thereof occasioned by the further compression 33 to the flat circular form of Fig. 8, and the friction corresponds to that slightly increased initial tension, and accordingly the degree of frictional engagement and security with which the nut is held against displacement on the stem 22 depends primarily upon the accumulated or initial tension in the split ring 24. This can be regulated by varying the amount of offset of the split ring ends 30 and 31 in the normal relaxed condition of the split ring as a greater amount of offset causes a greater amount of tension to be accumulated in the split ring when the ends 30 and 31 are brought into opposed aligning or substantially aligning relation.

Moreover, the tension may be regulated by varying the width of the split ring stock or the thickness thereof or both and, of course, the tension also depends upon the springiness of the material of which the split ring is composed.

Thus the tension and frictional engagement may be predetermined and almost any desired frictional effect obtained so that the nut will be held securely and with certainty in any position of adjustment on the stem 22.

The tension and frictional effect is substantially uniform at all times and the nut may be applied and removed repeatedly and indefinitely without injury to the threads of either the stem 22 or the nut and the holding effect of the gripping member is in no wise impaired by repeated application and removal of the nut from the stem. Moreover, the nut may be used and reused repeatedly with assurance that the holding effect remains the same. Furthermore, the holding facilities of this stop nut are unimpaired by exposure to oil, grease or reasonably high temperature and the holding facilities being housed within the nut are adequately protected against any accidental damage.

The nut body may be made in any conventional manner with the cavity 23 and keyway 29 to accommodate the gripping member 24, and it is preferred to form this nut body with an integral upstanding flange, as indicated by dotted lines at 26ª in Fig. 3, which is subsequently turned in over the gripping member 24 to hold the latter in place.

The gripping member may be made in any convenient manner, as for example by stamping same from a sheet of material of a thickness corresponding to the width (crosswise of the threads) of the split ring stock or it may be rolled in the ring form from a short length of stock which is of the width and thickness of the split ring stock and provided with a suitable offset to produce the key 28 on the split ring.

Moreover, this split ring may be formed initially in the spiral form or it may be initially of flat circular form and subsequently given the spiral form, and it may be internally threaded at any convenient time.

I have found it convenient, however, upon formation of the split ring, to insert same in the cavity 23 of the nut body and, while held securely and firmly against the base or shoulder 32 of the cavity 23, to internally thread the nut body and the split ring at the same time in the same operation, thus assuring that the threads 27 of the split ring are in exact continuity with the threads 21 of the nut body. Moreover, this threading is preferably arranged so that the median line of a thread 21, 27 intersects the plane of the seat 32 substantially at the split 25 of the split ring 24.

The imparting of the spiral form to the split ring may occur either before or after the threading thereof, and it is to be understood, of course, that if the threading occurs after the split ring has been given the spiral form, it must be compressed and held in the cavity 23 in flat circular form with the ends 30 and 31 thereof exactly opposed in the threading operation.

After the split ring is completely formed, it is inserted in the cavity 23 of the nut body and the upstanding flange 26ª is rolled or otherwise turned down thereover to the position shown at 26 in such manner as to leave the desired clearance 33 and permit the necessary relative movement of the ends 30 and 31 of the ring to insure the contemplated frictional engagement with the stem 22 when the latter is inserted in the nut.

Instead of making the gripping member or split ring as described above with the offset 28 engaging in the recess 29 of the nut body to key the gripping member against turning movement in the cavity 23, the gripping member and cavity may be made as illustrated in Fig. 9.

In this modified form of Fig. 9 the cavity 35 instead of being provided with a recess or keyway 29 is formed with a projection or rib 36 projecting inwardly from one side thereof, and the gripping member 37, which is in the form of a split ring of the same spiral form as that of the split ring 24, has the ends 38 and 39 separated sufficiently to accommodate therebetween the rib or projection 36 which thus serves as a key to hold the ring 37 against rotation.

This gripping member 37 is, of course, compressed in the cavity 35 in the same manner as the gripping member 24, between the shoulder 32 and the inturned flange 26 and serves to hold the nut frictionally on the stem 22 in the same manner as the gripping member 24 previously described.

This form of gripping member is advantageous in the respect that due to the elimination of the recess or keyway 29 of the construction of Figs. 1 to 8 inclusive, the cavity 35 may be made of large diameter and the stock of the ring 37 may be correspondingly thicker and this with the same width (crosswise of the threaded face) of split ring as that of the gripping member 24, the gripping member 37 may be provided with greater initial tension than that of the form of gripping member 24.

Moreover, the gripping member 37 may be made more readily due to the fact that it is a plain ring without any projection such as the projection 28 of the gripping member 24 and also with the arrangement of the holding rib or projection 36 between the ends of the ring 37 no undesirable wrapping action occurs either in the application or removal of the nut.

While the present invention has been shown and described in its preferred form, it is understood that various changes and modifications may be made therein without departing from the principles of the invention, the scope of which is to be determined by the appended claims.

What is claimed is:

1. A nut assembly or the like of the class described having an opening therethrough internally threaded to screw on a threaded stem, said internal threading including a non-displaceable portion and an adjoining, relatively non-rotatable portion which forms a continuation of the non-displaceable portion and is in a tensioned condition and displaced around the opening to a progressively increasing extent out of the normal path of continuity of the threading of the non-displaceable portion, said displaced portion being deflectable with augmented tension to the normal path of continuity of the threading of the non-displaceable portion and housed within a surrounding non-displaceable fixed part of the nut assembly.

2. A nut assembly or the like of the class described having an opening therethrough internally threaded to screw on a threaded stem, said internal threading including a non-displaceable portion and an adjoining, relatively non-rotatable portion which forms a continuation of the non-displaceable portion and is in a tensioned condition and displaced around the opening to a progressively increasing extent out of the normal path of continuity of the threading of the non-displaceable portion, said displaced portion being on the interior of an annularly confined springy split ring which has separable ends tending to separate in a direction axially of the opening through the nut assembly.

3. In a nut or the like of the class described, the combination of a nut body having an opening internally threaded to screw on a threaded stem, and an annular gripping member at one end of said opening comprising a circumferentially confined split ring non-rotatably attached to the nut body and having internal threading constituting a continuation of the internal threading of the nut body and deviating around the gripping member to a progressively increasing extent from the normal path of continuity of the internal threading of the nut body, said internal threading of the split ring being deflectable against an established tension to the normal path of continuity of the internal threading of the nut body.

4. In a nut or the like of the class described, the combination of a nut body having an opening which is internally threaded to screw on a threaded stem, said nut body having a cavity at one end of said opening, an annular springy gripping member non-rotatably mounted in said cavity and having internal threading constituting a continuation of the internal threads of the nut body, said gripping member having a portion thereof sprung axially outward and bearing at an established tension against a restraining abutment and carrying internal threading which is correspondingly displaced from the normal path of continuity of the internal threading of the nut body, said portion being deflectable with augmented tension to the normal path of continuity of the internal threading of the nut body.

5. In a nut or the like of the class described, the combination of a nut body having an opening which is internally threaded to screw on a threaded stem, said nut body having a cavity at one end of said opening, an annular gripping member non-rotatably mounted and circumferentially confined in said cavity and comprising a springy split ring having internal threads constituting a continuation of the internal threads of the nut body, and progressively deviating from the normal path of continuation of the internal threads of the nut body, said split ring having separable opposed ends under a tension tending to separate said ends in a direction axially of the opening of the nut body, a flange on the nut body overlying the gripping member and restricting separation of said split ring ends, and said split ring ends being relatively adjustable to a lesser extent of separation to deflect the internal threads of the split ring to the normal path of continuity of the threads of the nut body opening.

6. In a nut or the like of the class described, the combination of a nut body having an opening which is internally threaded to screw on a threaded stem, said nut body having a cavity at one end of said opening provided with an overlying inwardly extending flange, a gripping member non-rotatably mounted and circumferentially confined in said cavity and comprising a springy spiral split ring compressed in said cavity to a flatter spiral form, said flattened spiral ring having internal threads constituting a continuation of the internal threads of the nut body opening at a progressively increasing deviation from the normal path of continuation of the internal threads of the nut body opening, said deviation of said threads being eliminable by additional flattening of the spiral split ring.

7. In a nut or the like of the class described, the combination of a nut body having an opening which is internally threaded to screw on a threaded stem, said nut body having a cavity at one end of said opening provided with an overlying inwardly extending flange, a gripping member circumferentially confined in said cavity and comprising a springy spiral split ring compressed in said cavity to a flatter spiral form, said flattened spiral ring having internal threads constituting a continuation of the internal threads of the nut body opening at a progressively increasing deviation from the normal path of continuation of the internal threads of the nut body opening, said deviation of said threads being eliminable by additional flattening of the spiral split ring, said cavity having an abutment at one side interposed between the ends of the split ring to hold the latter against rotary movement in the cavity.

WILLIAM D. KELLY.